United States Patent
Kim

(10) Patent No.: US 8,650,577 B2
(45) Date of Patent: Feb. 11, 2014

(54) MOBILE TERMINAL AND CONTROLLING METHOD THEREOF

(75) Inventor: Sookyoung Kim, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 194 days.

(21) Appl. No.: 13/244,096

(22) Filed: Sep. 23, 2011

(65) Prior Publication Data

US 2012/0311592 A1 Dec. 6, 2012

(30) Foreign Application Priority Data

May 30, 2011 (KR) .................. 10-2011-0051454
Jun. 1, 2011 (KR) .................. 10-2011-0052723

(51) Int. Cl.
| G06F 9/46 | (2006.01) |
| G06F 15/173 | (2006.01) |
| H04H 20/71 | (2008.01) |
| H04W 72/00 | (2009.01) |
| H04B 7/00 | (2006.01) |
| H04W 24/00 | (2009.01) |
| H04B 1/38 | (2006.01) |
| H04B 1/02 | (2006.01) |
| H01S 4/00 | (2006.01) |

(52) U.S. Cl.
USPC ......... 718/108; 718/101; 718/102; 718/103; 709/238; 455/3.01; 455/435.3; 455/512; 455/456.3; 455/73; 455/91; 455/899

(58) Field of Classification Search
None
See application file for complete search history.

(56) References Cited

U.S. PATENT DOCUMENTS

| 2004/0143833 A1* | 7/2004 | Heyrman et al. ........... 718/100 |
| 2007/0157207 A1* | 7/2007 | Kim et al. ................. 718/103 |
| 2008/0120619 A1* | 5/2008 | Podila ....................... 718/102 |
| 2008/0246341 A1* | 10/2008 | Pelley et al. ................ 307/80 |
| 2008/0311929 A1* | 12/2008 | Carro et al. ............. 455/456.3 |
| 2009/0044188 A1* | 2/2009 | Kanai et al. ............... 718/100 |
| 2009/0113434 A1* | 4/2009 | Podila ....................... 718/102 |
| 2009/0113442 A1* | 4/2009 | Deidda et al. ............. 718/105 |
| 2009/0217273 A1* | 8/2009 | Mutlu et al. ............... 718/101 |
| 2009/0313490 A1* | 12/2009 | Tani ........................... 713/320 |
| 2009/0328039 A1* | 12/2009 | Miller et al. ............... 718/100 |
| 2010/0313270 A1* | 12/2010 | Kim et al. .................. 726/24 |
| 2011/0060623 A1* | 3/2011 | Neureuter .................... 705/8 |
| 2012/0159499 A1* | 6/2012 | Shafiee et al. .............. 718/103 |

OTHER PUBLICATIONS

Pillai, et al., "Real-Time Dynamic Voltage Scaling for Low-Power Embedded Operating Systems," XP055058610, Jan. 2001, 14 pages.

(Continued)

*Primary Examiner* — Emerson Puente
*Assistant Examiner* — Adam Lee
(74) *Attorney, Agent, or Firm* — Lee, Hong, Degerman, Kang & Waimey

(57) ABSTRACT

A mobile terminal and controlling method thereof are disclosed, by which a scheduling function of giving a processing order to each of a plurality of tasks is supported. The present invention includes a memory including an operating system having a scheduler configured to perform a second scheduling function on a plurality of tasks, each having a processing order first-scheduled in accordance with a first reference and a processor performing an operation related to the operating system, the processor processing a plurality of the tasks. Moreover, if a first task among a plurality of the first-scheduled tasks meets a second reference, the scheduler performs the second scheduling function by changing the processing orders to enable the first task to be preferentially processed.

15 Claims, 12 Drawing Sheets

(56) References Cited

OTHER PUBLICATIONS

Yuan, et al., "Energy-Efficient Soft Real-Time CPU Scheduling for Mobile Multimedia Systems," XP055058614, Jan. 2003, 15 pages.
Culver, et al., "A Dynamic Voltage Scaling Algorithm for Energy Reduction in Hard Real-Time Systems," Jan. 2005, XP010814477, 4 pages.
European Patent Office Application Serial No. 12000503.8, Search Report dated Apr. 18, 2013, 7 pages.

* cited by examiner

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0051454, filed on May 30, 2011 and Korean Application No. 10-2011-0052723, filed on Jun. 1, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for supporting a scheduling function of giving a processing order to each of a plurality of tasks.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a mobile terminal is working to expand its field of utilization, the demand for a long-term durable battery to keep up with function development is rising. Therefore, the demand for a software method for increasing a last time of a battery is rising as well as a hardware method.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a scheduling function of newly giving a changed processing order to each of a plurality of tasks can be supported in case of a presence of a task meeting a preset reference among a plurality of the tasks having determined processing orders.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory including an operating system having a scheduler configured to perform a second scheduling function on a plurality of tasks, each having a processing order first-scheduled in accordance with a first reference and a processor performing an operation related to the operating system, the processor processing a plurality of the tasks, wherein if a first task among a plurality of the first-scheduled tasks meets a second reference, the scheduler performs the second scheduling function by changing the processing orders to enable the first task to be preferentially processed.

In another aspect of the present invention, a method of controlling a mobile terminal includes the steps of performing, by a scheduler included in an operating system, a first scheduling of determining a processing order of each of a plurality of tasks in accordance with a first reference, determining if a first task among a plurality of the first-scheduled tasks meets a second reference, and if the first task meets the second reference, performing a second scheduling function by changing the processing orders to enable the first task to be preferentially processed.

In another aspect of the present invention, a mobile terminal includes a memory including an operating system having a scheduler configured to quantify a plurality of tasks into at least one workload in accordance with a preset reference to process a plurality of the tasks and a processor configured to process an operation related to the operating system and the at least one workload, wherein the preset reference is a switching timing point of an arrival of a second task from a timing point of an arrival of a first task followed by the first task among a plurality of the tasks.

In further aspect of the present invention, a method of controlling a mobile terminal includes the steps of quantifying, by a scheduler included in an operating system for processing a plurality of tasks, a plurality of the tasks into at least one workload in accordance with a preset reference and processing, by a processor, the at least one workload, wherein the preset reference is a switching timing point of an arrival of a second task from a timing point of an arrival of a first task followed by the first task among a plurality of the tasks.

Accordingly, the present invention provides the following effects and/or advantages.

First of all, if a task meeting a preset reference exists among a plurality of tasks having determined processing orders, the present invention is able to provide a scheduling function of newly giving a processing order to each of a plurality of the tasks.

Secondly, the present invention is able to determine a frequency and voltage for operating a processor based on newly scheduled processing orders of a plurality of tasks.

Thirdly, a preset reference applicable to a mobile terminal according to at least one embodiment of the present invention can indicate whether a task uses a resource, which can complete a task performance only if used at a specific timing, among a plurality of resources having task timing constraints different from each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
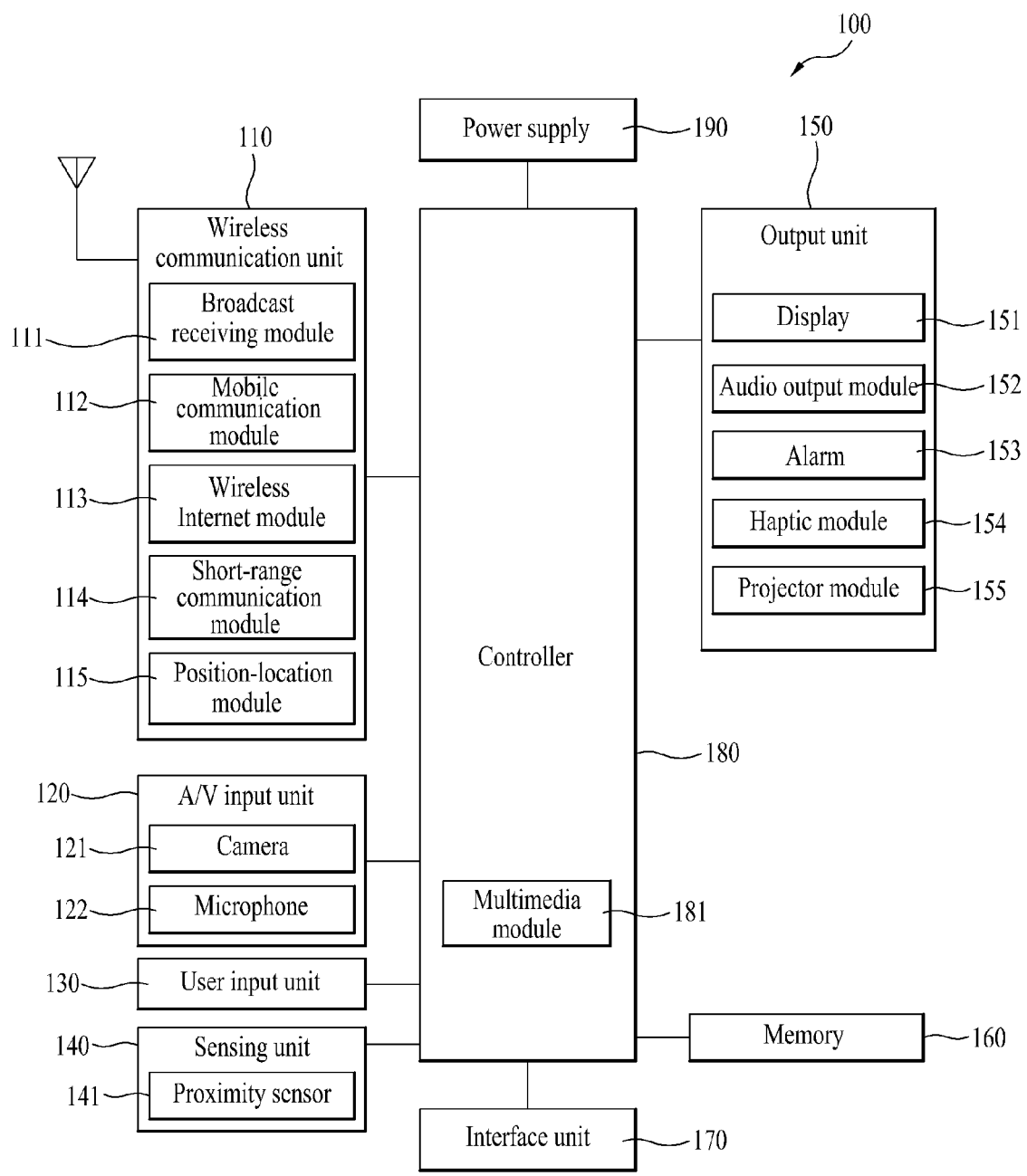
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
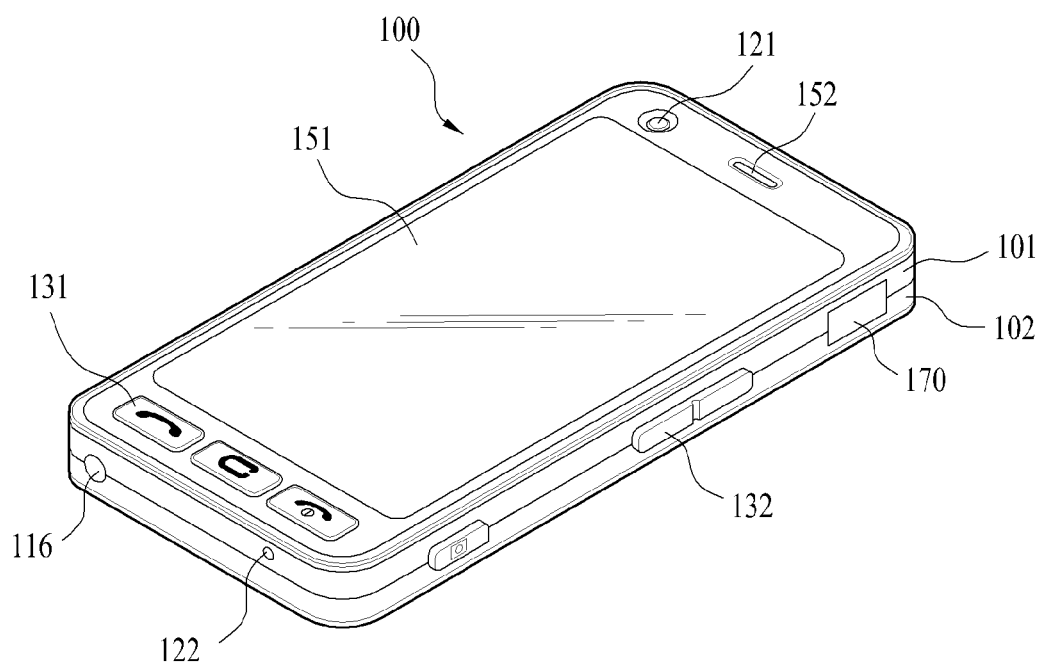
FIG. 2 is a front perspective diagram of a mobile terminal according to one embodiment of the present invention.

FIG. 2 is a front perspective diagram of a mobile terminal 100 according to various embodiments of the present invention. The mobile terminal 100 is shown as a bar type terminal body, but the mobile terminal may alternatively be implemented using other configurations such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
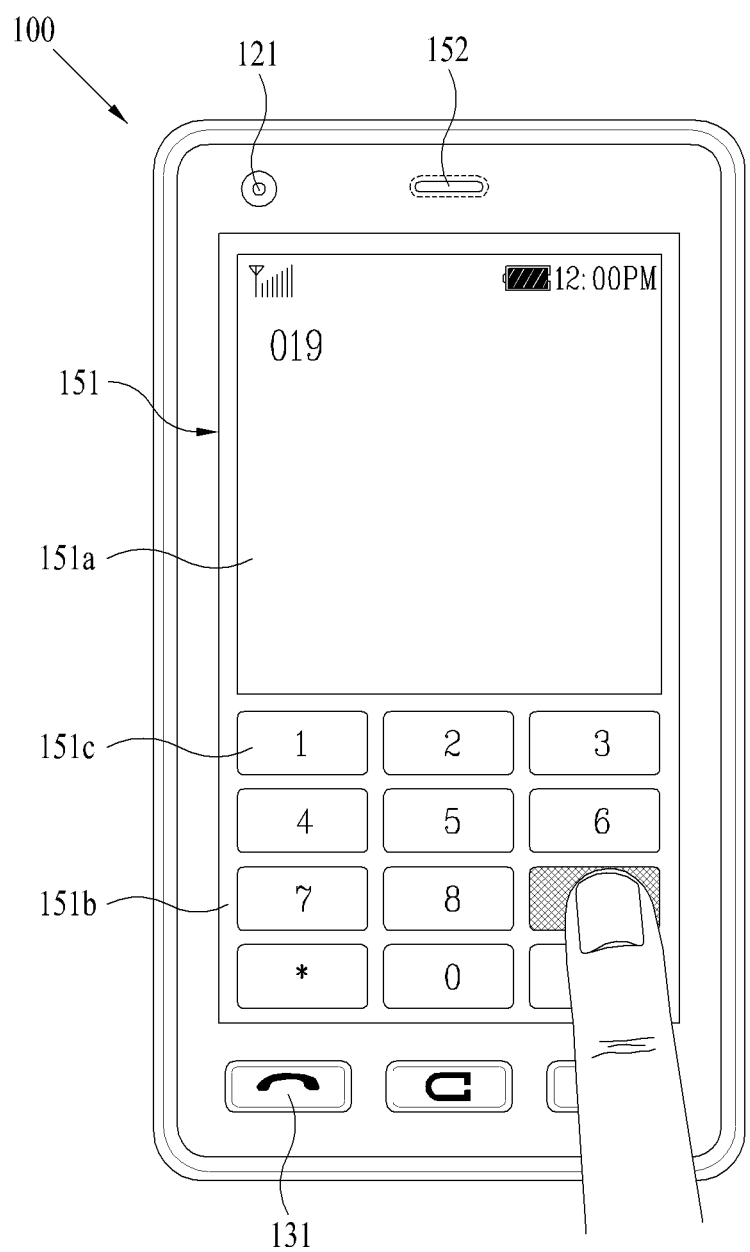
FIG. 3 is a front diagram of a mobile terminal according to one embodiment of the present invention to describe one operating status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a.

If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

For clarity and convenience of the following description, assume that a mobile terminal 100 mentioned in the following description includes at least one of the components shown in FIG. 1.

In case that a processor attempts to process a plurality of tasks, the processor processes a plurality of the tasks in accordance with a schedule determined by an operating system stored in a memory instead of processing a plurality of the tasks in random orders.

Representatively, a kernel included in the operating system is able to provide a scheduling function of determining processing orders of a plurality of tasks.

The kernel is the most important core part in a computer operating system and provides various kinds of basic services to the rest of the operating system. The kernel can be compared to a shell. In this case, the shell is situated on a most outer part of the operating system and is responsible for handling a user command.

The kernel generally includes an interrupt processor for processing all requests for such a kernel service as a terminated input/output operation and the like in contention, a scheduler for determining what programs will share a processing time of the kernel in a prescribed order, a supervisor for giving a use right of a computer to each process actually after completion of a schedule, and the like.

And, the kernel has a memory manager for managing an address space of an operating system in a memory or a storage device and equally distributing all peripheral devices and other users using the services of the kernel. The service of the kernel is requested via another part of the operating system or a series of program interfaces known as a system paging.

The scheduling for a plurality of tasks is performed by the scheduler included in the kernel. Representatively, the scheduler is able to perform the scheduling for determining processing orders for a plurality of the tasks with reference to a generated timing point of each of a plurality of the tasks.

Recently, as a mobile terminal is working to expand its field of utilization, the demand for a long-term durable battery to keep up with function development is rising.

Aside from a hardware method, a software method for elongating a duration of a battery includes a method of lowering a clock frequency and a supply voltage for an operation of a processor within a range in which performance degradation can be avoided. For representative example of such a method, there is DVFS (dynamic voltage and frequency scaling) scheme.

In the DVFS scheme is applied, it is able to lower a frequency and voltage for driving a processor to result in an effect of extending a battery use time. Yet, there exists a limitation put on lowering a frequency and a voltage within a prescribed range, in which performance degradation is avoided, in case of processing a task.

In this case, it is able to utilize scheduling method for enabling an urgent task, which determines performance of a mobile terminal, to be preferentially performed. As mentioned in the foregoing description, the scheduling for determining the processing orders of a plurality of the tasks is performed via the scheduler.

According to a related art, a scheduler gives a processing order to each of a plurality of tasks with reference to a timing point of generation without discerning an urgent task, by which performance is determined, from a non-urgent task having no relation with the performance.

In this case, if a scheduling is performed in a manner of giving a primary processing order to the urgent task, which determines the performance, to preferentially process the urgent task and giving a secondary processing order to the non-urgent task having no relation with the performance, it is able to secure an effect that a frequency and voltage can be further lowered within a range free from performance degradation.

In particular, after a scheduler has performed a scheduling function in a manner of giving a processing order in accordance with a prescribed reference (e.g., a task generated timing point reference, a purpose and behavior of a task, etc.), if the scheduler confirms that an urgent task, which determines performance, is included in a plurality of tasks, a rescheduling function of giving a preferential processing order to the urgent task can be provided. Therefore, a frequency and voltage used by a processor can be further lowered and a durable time of a battery can be further extended eventually.

Yet, if the scheduler performs an action of giving the preferential processing order to the urgent task, it causes a problem that it is difficult to distinguish an urgent task, which determines performance, from a non-urgent task having no relation with the performance.

According to the present invention, to solve the above problem, provided is a method of distinguishing an urgent task and a non-urgent task from each other in accordance with a hardware resource or a software resource used in processing tasks in a manner of observing a behavior of each of the tasks in a kernel region.

The hardware or software resources used in processing tasks can have different timing constraints. In particular, the hardware or software resources can include a resource capable of completing a task performance in case of being used at a specific timing, a resource capable of completing a task performance in case of being used at a random timing, a resource capable of completing a task performance in case of being used at a preset ratio during a random period irrespective of a timing and the like.

And, the hardware or software resources can include resource of various types that can be used by a mobile terminal.

For instance, regarding a wireless communication task, a modem is a hardware resource and a driver for controlling the modem corresponds to a software resource. Due to the features of a job for performing a communication with a network or a remote device in wireless communication, the modem and the driver should operate at an exact timing point to enable a task performance. If the modem and the driver do not operate at the exact timing point, since it is unable to perform such a desired task as a phone call, a data transceiving and the like, performance is degraded. Therefore, the wireless communication task, which uses the modem of the hardware resource and the driver of the software resource, can be classified into an urgent task.

The present invention provides a rescheduling function as follows. First of all, a plurality of tasks are classified into urgent tasks and non-urgent tasks. And, the tasks are classified into at least two types and groups in accordance with a purpose and behavior of a task. A scheduler performs a scheduling function of determining a processing order of each of a plurality of the tasks in accordance with a prescribed reference. If an urgent task is included in a plurality of the scheduled tasks, the processing order is changed to enable the urgent task to be preferentially processed.

A task processing method in accordance with a rescheduling is described with reference to FIG. 4 as follows.

FIG. 4 is a diagram for one example of determining a task processing order to enable a task, which affects performance, to be preferentially executed according to one embodiment of the present invention.

Referring to FIG. 4, assume that a task's deadline of an urgent task 410 is indicated by reference number 411 and a task's deadline of a non-urgent task 420 is indicated by the reference number 421.

Figure 4A:
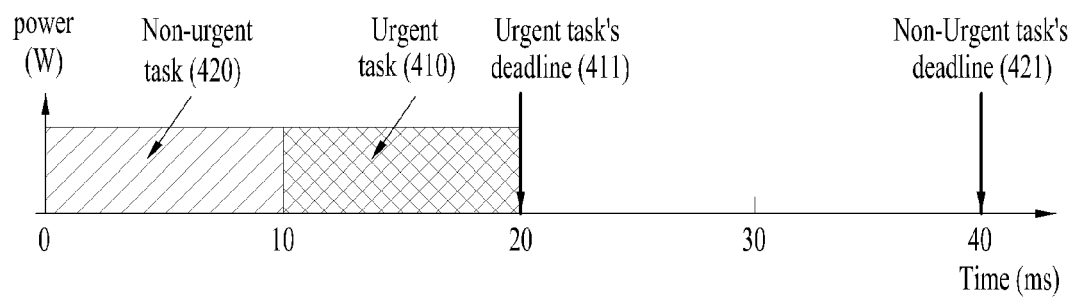
FIGS. 4A and 4B are diagrams for one example of determining a task processing order to enable a task, which affects performance, to be preferentially executed according to the present invention.

FIG. 4A shows one example of processing each task according to a scheduling for giving a processing order with reference to a task generated timing point without classifying a plurality of tasks into urgent tasks and non-urgent tasks.

Referring to FIG. 4A, a processing order is given to enable the non-urgent task 420 to be preferentially executed. And, a processing order is given to enable the urgent task 410 to be executed behind the non-urgent task 420. Hence, despite that the urgent task 410 exists, as the urgent task 410 is executed after completion of processing the non-urgent task 420, a considerably high power is required in a short time. In particular, a time has a relation inverse-proportional to a frequency but a power has a relation proportional to a voltage. Hence, in order to drive a processor, a high frequency and a high voltage are required.

Figure 4B:
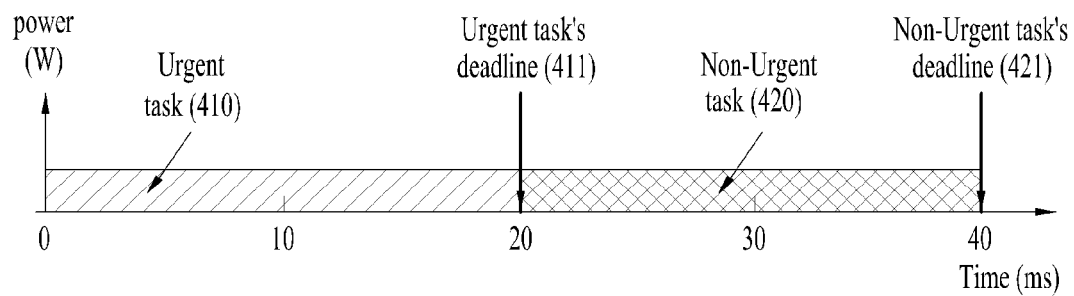

On the contrary, referring to FIG. 4B, a scheduling is performed in a manner of giving a preferential processing order to an urgent task 410 and then giving a next processing order to a non-urgent task 420. Hence, the urgent task 410 is processed until the deadline 411 and the non-urgent task 420 can be then processed until the deadline 421.

In doing so, since a task can be processed with a low power in a long time, a processor can be driven on a low frequency at a low voltage. Therefore, it is able to secure such an effect as saving battery consumption.

In the following description, the details of the present invention are explained with reference to FIG. 5.

Figure 5:
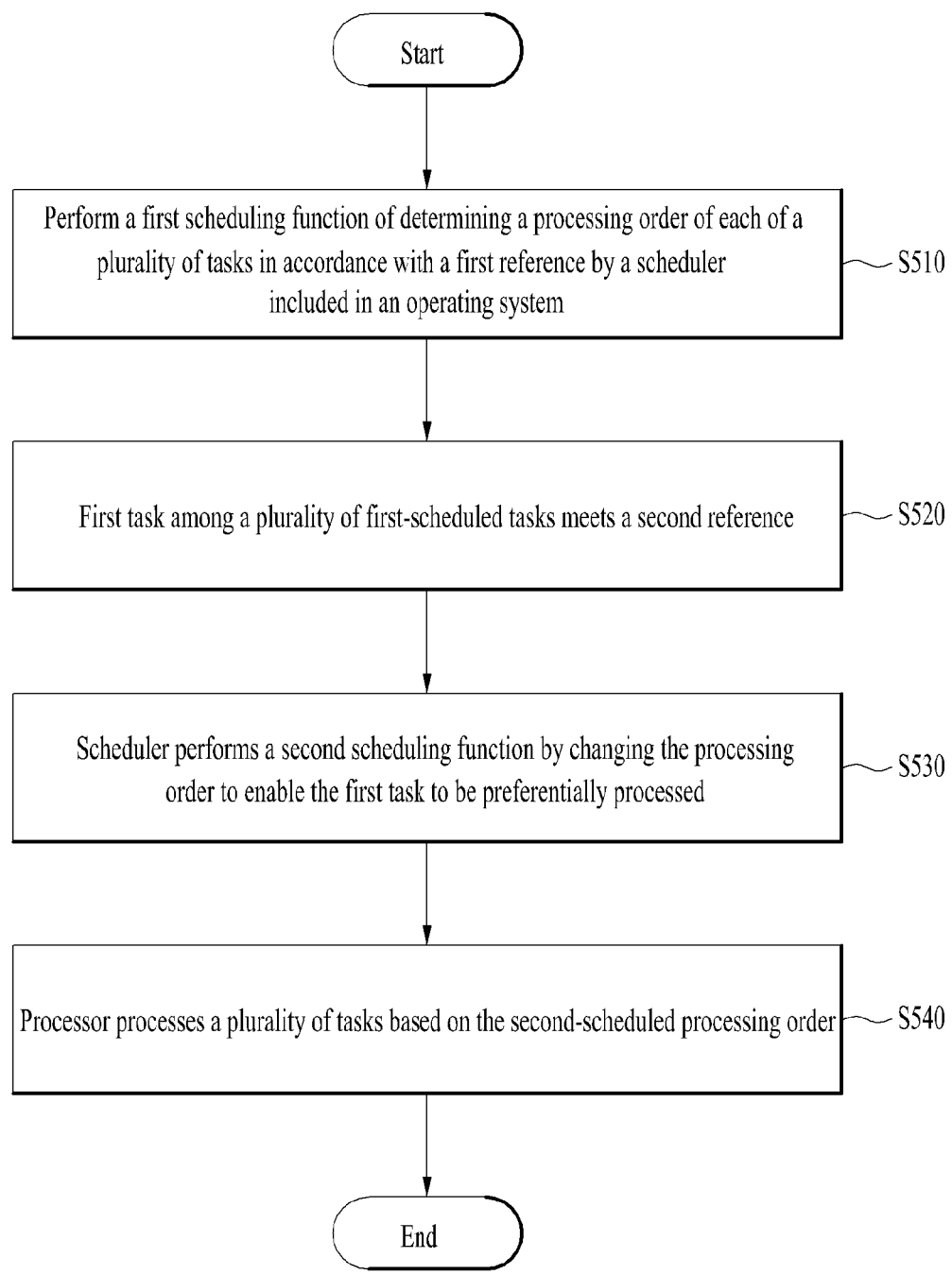
FIG. 5 is a flowchart for one example of providing a scheduling function of giving changed processing orders to a plurality of tasks, if a preset reference is met, according to the present invention.

FIG. 5 is a flowchart for one example of providing a scheduling function of giving changed processing orders to a plurality of tasks, respectively, if a preset reference is met, according to the present invention.

Referring to FIG. 5, a scheduler included in an operating system is able to perform a scheduling function of determining a processing order for each of a plurality of tasks in accordance with a prescribed reference [S510].

In this case, the prescribed reference for the scheduler to determine the processing order for each of the tasks can be a generated timing point of a plurality of the tasks representatively. Yet, the generated timing point is just exemplary and the task processing order can be determined in accordance with other references. For clarity and convenience of the following description, the prescribed reference is named a first reference and a scheduling according to the first reference is named a first scheduling.

Subsequently, at least one of a plurality of the first-scheduled tasks can be determined as an urgent task [S520]. If there exists the task determined as the urgent task, the scheduler performs a new scheduling function of changing the first scheduled processing order in order to enable the existing task to be preferentially processed [S530].

As mentioned in the forgoing description of the present invention, urgent tasks and non-urgent tasks are subdivided into at least two predefined types and groups in accordance with a hardware or software resource used for the task processing in a manner of observing a behavior of each task in a kernel region.

The hardware or software resources used for the task processing can have different timing constraints. In particular, according to the timing constraints, the resources can be classified into a resource capable of completing a task performance in case of being used at a specific timing, a resource capable of completing a task performance in case of being used at a random timing, a resource capable of completing a task performance in case of being used at a preset ratio during a random period irrespective of a timing and the like.

In this case, the tasks are classified into urgent tasks and non-urgent tasks with reference to the hardware or software resource used for the task processing.

For instance, since a resource capable of completing a task performance in case of being used at a specific timing may cause degradation of terminal performance, a task, which uses the resource capable of completing the task performance in case of being used at the specific timing, can be determined as an urgent task. With reference to whether a task uses a resource capable of completing a task performance in case of being used at a random timing or a resource capable of completing a task performance in case of being used at a preset ratio during a random period irrespective of a timing, it is able to determine whether the corresponding task is an urgent task.

In the following description, a reference for distinguishing the urgent task from a non-urgent task shall be named a second reference and a new scheduling according to the second reference shall be named a second scheduling in order to distinguish the first reference and the first scheduling from the second reference and the second scheduling, respectively.

Subsequently, a processor processes each of a plurality of tasks based on the second-scheduled processing order [S540].

Therefore, since a frequency and voltage for operating the processor can be determined based on the second-scheduled processing orders of a plurality of the tasks, it is able to use a minimal frequency and a minimal voltage. In particular, as the processor can be driven using the minimal frequency and voltage by avoiding performance degradation, it is able to guarantee such an effect as a long-term use of a battery.

The effect of the present invention is described in detail with reference to FIG. 6 as follows.

FIG. 6 is a diagram for one example of an effect after determining a task processing order to preferentially execute a task, which affects performance, according to the present invention.

In FIG. 6, assume that a workload value of each of an urgent task and a non-urgent task is 10.

Figure 6A:
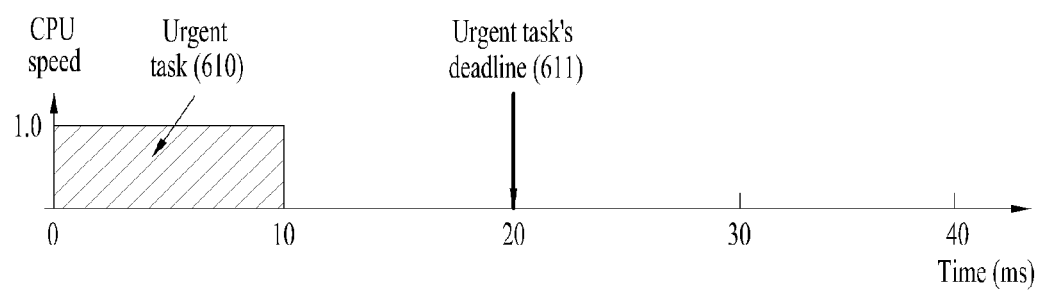
FIGS. 6A, 6B and 6C are diagrams for one example of an effect after determining a task processing order to preferentially execute a task, which affects performance, according to the present invention.

Referring to FIG. 6A, a workload of an urgent task 610 and a speed of a processor for processing the workload are shown. In order to compare an effect of the present invention, it is able to apply a concept of MFS (minimum feasible speed).

The MFS means a minimum value among speed of the processor for completing a given workload within a task's deadline. In case that a plurality of task exist, an MFS value obtained in consideration of other tasks can be called CMFS (compound minimum feasible speed).

In FIG. 6A, a single urgent task 610 exists only. A workload of the urgent task 610 is 10. Since a task's deadline 611 of the urgent task 610 is 20, MFS becomes 10/20 (=0.5).

Figure 6B:
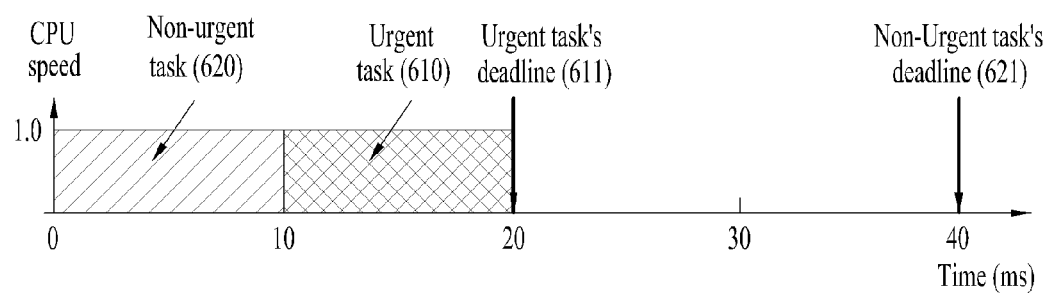

Referring to FIG. 6B, a scheduling type, in which a non-urgent task 620 and an urgent task 610 are mingled together. In FIG. 6B, a processing order is given in a manner that the non-urgent task is processes more preferentially than the urgent task.

Although a task's deadline 621 of the non-urgent task 620 is 40, if a processing order is taken into consideration, the urgent task 620 should be preferentially processed in order to process the urgent task 610. Eventually, both of the non-urgent task 620 and the urgent task 610 should be processed within 20 that is the task's deadline 61 of the urgent task 610.

Hence, if we find CMFS, since total workloads are 20 and total task's deadlines become 20 that is the task's deadline of the urgent task 610, it becomes 1 (=20/20).

Figure 6C:
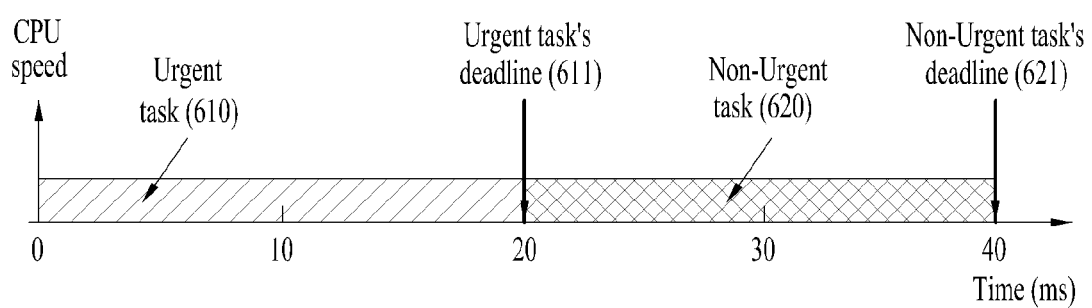

In this case, if a scheduler performs a scheduling in a manner of giving a new processing order to preferentially process the urgent task 610 in FIG. 6B, the result can be shown as FIG. 6C.

In doing so, if the urgent task 610 is processed until 20 that is the task's deadline 611 of the urgent task 610, a job can be achieved. If the non-urgent task 620 is processed until 40 that is a task's deadline 621 of the non-urgent task 620, total tasks can be processed.

Hence, although the total workloads become 20, as shown in FIG. 6B, since total task's deadlines become 40 that is the task's deadline 621 of the non-urgent task 620, CMFS becomes 0.5 (=20/40). The CMFS in FIG. 6C becomes ICMFS (ideal CMFS) that is a value of ideal CMFS. Comparing to FIG. 6B, since a speed of a processor in use can be reduced to 0.5 from 1.0, it brings an effect that a battery duration can be extended by reducing a consumed operating current.

Meanwhile, according to one embodiment of the present invention, a plurality of tasks can be classified into a plurality of groups to have processing orders differing from each other in accordance with a resource used to perform each task. A scheduler determines that each task belongs to a specific one of a plurality of the groups and is then able to provide a second scheduling function to change a processing order of each task in accordance with a processing order given to the specific group to which the corresponding task belongs.

In particular, a scheduling method can be applied in a following manner. First of all, a processing order is given per group instead of giving a processing order by a task unit. Secondly, it is determined that each task belongs to a prescribed group. Thirdly, the processing order, which is given to the prescribed group, is given to each task.

Representatively, a reference for distinguishing a plurality of groups can use at least one of a type of a resource used by each task and a use ratio of the resource.

For instance, a plurality of the groups can be classified into a first group having a top priority processing order, a second group having a priority next to that of the first group, a third group having a priority next to that of the second group, and a fourth group having a priority next to that of the third group.

In this case, the first group is HRT (hard real-time task) that is the group including a plurality of tasks using a resource capable of completing a task performance in case of being used at a specific timing only, the second group is DBSRT (deadline based soft real-time task) that is the group including a plurality of tasks using a resource capable of completing a task performance in case of being used at a random timing, the third group is RBSRT (rate based soft real-time task) that is the group including a plurality of tasks using a resource capable of completing a task performance in case of being used at a preset ratio for a random period, and the fourth group can be the group including a plurality of tasks except the tasks included in one of the first to third groups among a plurality of the classified groups.

For distinguishing the classified a first group, a second group, a third group and a fourth group more clearly, each of groups has a different processing number. Namely, the controller 180 assigns each of a plurality of processing numbers to each of the plurality of tasks according to the processing order and the plurality of processing numbers are distinguished according to each of the classified plurality of groups.

For instance, a first group has processing numbers of 100~200 (e.g. 110, 120, 130, etc), a second group has processing numbers of 200~300 (e.g. 210, 220, 230, etc), a third group has processing numbers of 300~400 (e.g. 310, 320, 330, etc) and a fourth group has processing numbers of 400~500 (e.g. 410, 420, 430, etc).

This helps that the controller 180 confirm the processing number, given to each of tasks, and decide the group according to the processing number easily.

This is described in detail with reference to FIG. 7 as follows.

Figure 7:
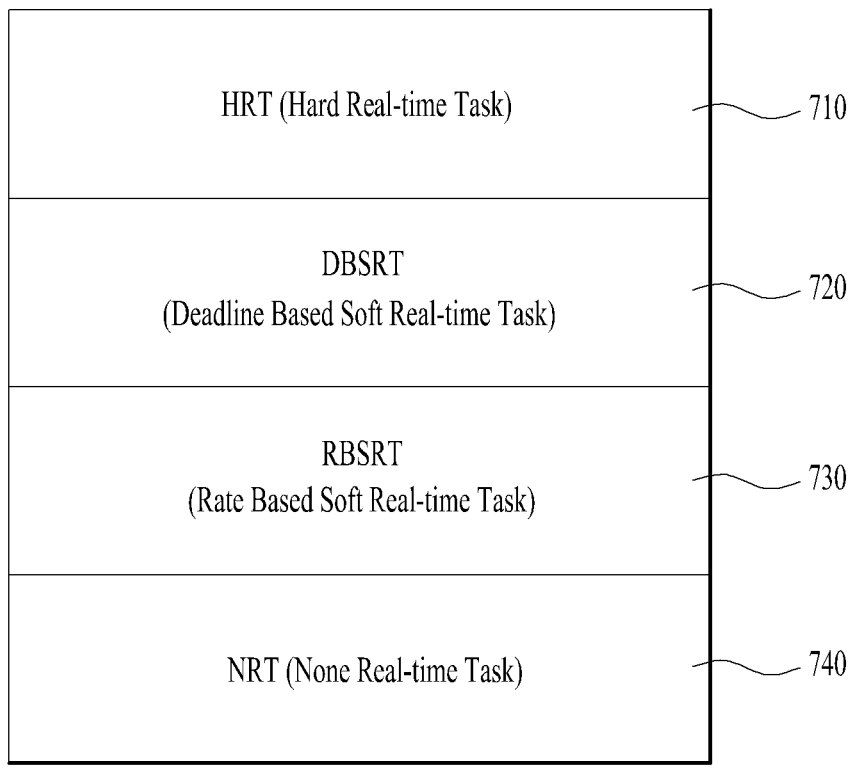
FIG. 7 is a diagram for one example of classifying a plurality of tasks into a plurality of groups, of which processing orders are different from each other in accordance with a used resource, according to one embodiment of the present invention.

FIG. 7 is a diagram for one example of classifying a plurality of tasks into a plurality of groups, of which processing orders are different from each other in accordance with a used resource, according to one embodiment of the present invention.

Referring to FIG. 7, a plurality of groups include an HRT group 710, a DBSRT group 720, an RBSRT group 730 and an NRT group 740.

The HRT group 710 means the group including a plurality of tasks capable of completing a task performance in case of being used at a specific timing only.

For instance, a wireless communication task uses a modem, which is a hardware resource for performing a wireless communication, and a driver, which is a software resource, to control the modem.

In this case, due to the properties of the wireless communication task in communicating with a network or a remote device, such a desired job as a phone call, a data transmission and reception and the like fails unless the modem and the driver resources operate at an exact timing point.

If the job fails, it means that the task should be performed all over again. And, the terminal operation related to a previous task processing becomes meaningless. Thus, since the significance of a resource capable of completing a task performance in case of being used at a specific timing only is very high, a task, which uses such a resource, can be classified into the HRT group having the top priority processing order.

In particular, if a modem of a network receives a call signal, a driver of the modem receives and forwards the call signal to a daemon. The daemon then delivers the signal to a corresponding application related to a phone call. As modem and driver resources applied to the HRT group should be used to process such a task, the task shall be classified into the HRT group.

For a representative example of another resource applied to the HRT group, there are Bluetooth, Wi-Fi and the like.

The DBRST group 720 means the group including a plurality of tasks using a resource capable of completing a task performance in case of being used at a random timing.

For instance, although a timing constraint attributed to a user's recognition power exists in one of a video play, a video taking, a photographing, a music play, a music recording, a response to a user's touch and the like, since the timing constraint is a soft timing constraint, data is not deleted if a processing is slightly behind a schedule. Hence, a task, which uses a resource capable of completing a task performance in case of being used at a random timing, can be classified into the DBSRT group having a processing order next to that of the HRT group.

In particular, regarding a video play task, an sd-card device is a hardware resource, an sd-card driver is a software resource, and a media server becomes a daemon.

If the media server provides video data to a video player, the video player decodes the provided video data. The video player distributes data of a video to a frame buffer (i.e., a graphic memory) via a surface flinger of a system server and also distributes audio to a speaker by sending the audio to an audio sever via an audio flinger of a media server. Since such a resource used for the video play task corresponds to the resource capable of completing a task performance in case of being used at a random timing, the corresponding task will be classified into the DBSRT group.

The RBSRT group 730 is the group including a plurality of tasks using a resource capable of completing a task performance in case of being used at a preset ratio for a random period irrespective of a timing.

For instance, a kernel task or a daemon task may be related to such a hardware resource as a system memory, a CPU, a bus and the like or may not. Such a resource just operates at a determined speed but does not have a specific timing constraint. Even if such a resource has a specific timing constraint, it does not become a control target. Yet, if such a resource is used at a predetermined ratio for a random period, a task performance can be completed. If a task uses this resource, it can be classified into the RBSRT group.

For instance, while an application is running, if an operation is terminated, a remaining memory is collected to be usable for another application. This is called a memory swapping. And, kswapd, which is a kernel thread for doing such a job as the memory swapping, performs the operation once per 15 seconds of a predetermined interval, the task will be classified into the RBSRT group.

Finally, tasks failing to belong to one of HRT, DBSRT and RBSRT can be classified into the NRT group 740.

Besides, each task is not fixedly classified into a specific group but can be flexibly classified into one of HRT, DBSRT, RBSRT and NRT in accordance with a timing point of using a resource applied to process the corresponding task.

Yet, the above-mentioned HRT, DBSRT, RBSRT and NRT are just exemplary. And, a task can be classified into a group of a different type in accordance with a type and use ratio of a resource used by the corresponding task.

Therefore, the present invention is able to provide a second scheduling function of classifying a plurality of tasks into a plurality of groups and then changing a processing order of each of the tasks in accordance with a processing order given to the group to which the corresponding task belongs.

And the above-mentioned the plurality of processing numbers may be used to distinguish the classified a first group, a second group, a third group and a fourth group more clearly.

Thus, it is possible to perform a scheduling in a manner that tasks included in a task group, which affects a performance, are preferentially processed. Therefore, a supply voltage and frequency of a processor can be reduced to the minimum, whereby a battery duration can be extended to the maximum.

Meanwhile, in case that a processor attempts to process a plurality of tasks, it is able to process a plurality of the tasks in accordance with a workload determined by an operating system stored in a memory instead of processing a plurality of the tasks randomly.

In this case, the workload is a quantified size of a load processed by a processor by measuring a transaction response time, an input/output service rate, a CPU use time and the like. Namely, an operating system quantifies a plurality of tasks by a plurality of workload units in accordance with a preset reference, and a processor is then able to process a plurality of the tasks all by processing a plurality of the quantified workloads.

Representatively, a kernel included in an operating system is able to provide a function of quantifying a plurality of tasks into a plurality of workloads in accordance with a preset reference.

The function of quantifying a plurality of tasks into a plurality of workloads in accordance with a preset reference is performed by a scheduler included in the kernel. Representatively, the preset reference can include a predetermined period. Each time the period elapses, the scheduler computes a new workload by quantifying a plurality of tasks.

Recently, as a mobile terminal is working to expand its field of utilization, the demand for a processor having excellent performance to keep up with function development is rising. Therefore, as a method of enhancing performance of a processor by means of software as well as hardware, it is able to apply a method of enabling a processor to process an assigned workload at a minimum speed.

If an operating speed of a processor is lowered, power is consumed less. Therefore, battery consumption is minimized and an environment advantageous for processing multitasking can be provided.

In order to calculate a minimum processor speed in accordance with an assigned workload, it is necessary to calculate an exact workload.

As mentioned in the foregoing description, a process for calculating a plurality workloads for a plurality of tasks is performed by a scheduler.

Conventionally, a plurality of tasks are quantified into a plurality of workloads with reference to a predetermined period and a processor processes a plurality of the quantified workloads.

In doing so, if a preset period is shorter than a time required for processing a prescribed task, it causes a problem that a workload required for processing the rest of tasks after the arriving period is not predictable. In particular, a scheduler should calculate a workload on the assumption that there is the same task of a previous period until a next period is reached. If the time for processing the task is shorter than the next period, it can cause a result that an operating speed of a processor is increased by calculating excessive workloads. Such an increase o the operating speed of the processor can lead to excessive battery consumption and tasking performance degradation.

In order to solve the above problem, it may be able to apply a method of elongating a period. Yet, in case that a time required for processing an arriving task is longer than the elongated period, the same problem is caused. Hence, it is difficult for the period elongating method to become a fundamental solution.

Accordingly, the present invention provides a method of calculating a workload with reference to a switching timing point of an arrival of a next task from a timing point of an arrival of one task. In particular, since an idle interval exists between a timing point at which one arriving task is finished and a timing point at which a next task arrives, if a workload is calculated with reference to a switching timing point of an arrival of a next task from a timing point of an arrival of one task, a total processing time of each task can be taken into consideration. Therefore, it is able to calculate an exact workload.

A workload calculating method, to which an arrival timing point of a task is applied, is described as follows.

FIG. 8 is a diagram for one example of quantifying a plurality of tasks into workloads with reference to a time from a timing point, at which a prescribed task arrives, to a timing point, at which a next task arrives, according to the present invention.

Figure 8A:
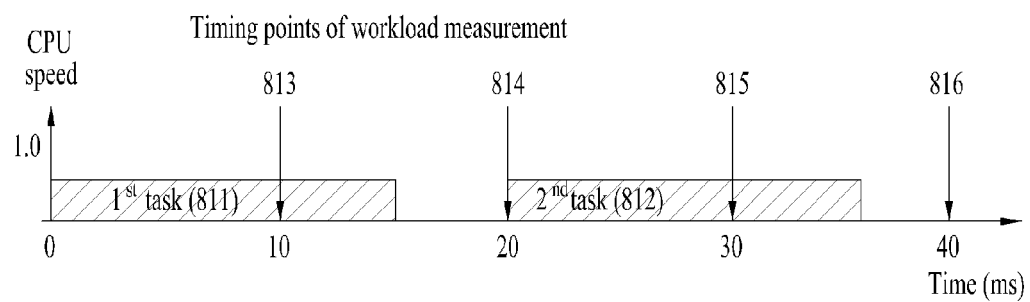
FIGS. 8A and 8B are diagrams for one example of quantifying a plurality of tasks into workloads with reference to a time from a timing point, at which a prescribed task arrives, to a timing point, at which a next task arrives, according to the present invention.

FIG. 8A shows one example of applying a method of calculating a workload for a task with reference to a predetermined period according to a conventional system.

In FIG. 8A, assume that a period is set to 10 ms.

Referring to FIG. 8A, since a time required for processing a first task 811 is 15 ms, it can be confirmed that the required time is longer than the preset period of 10 ms.

Although a workload size of 0~10 ms can be exactly calculated, it is unable to predict a workload size between 10~20 ms. Hence, a workload is calculated in a manner that the unpredictable workload size has the same size of the workload between 0~10 ms.

Although a processor speed actually required in 0~20 ms is 0.75 (=15/20), since it is processed as a speed of 1 (=20/20), current consumption is unnecessarily increased to cause such a problem as a battery consumption increase and the like.

Since an interval required for processing a second task 812 is longer than a set period, it causes a problem that an operating speed of a processor is unnecessarily raised in an interval of 20~40 ms like the former interval of 0~20 ms.

In this case, it may be able to consider a method of elongating a period into 20 ms. However, as mentioned in the foregoing description, if a task requesting a processing time more than 20 ms arrives, the same problem is caused. Hence, this method can not become a fundamental solution as well.

Figure 8B:
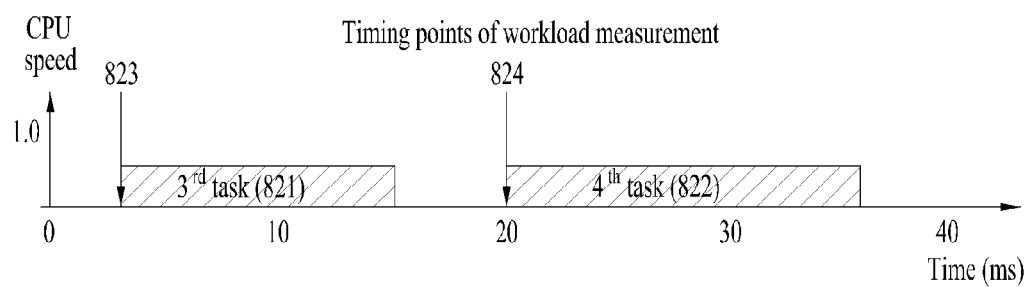

On the other hand, referring to FIG. 8B, applied is a method of quantifying a plurality of tasks into workloads with reference to an arrival timing point of a second task from an arrival timing point of a first task.

In this case, a workload size can be calculated in an interval from an arrival timing point 823 of a third task 821 to a switching timing point of an arrival of a fourth ask 822. If the third task 821 is terminated, it has an interval that always ends as idle. Hence, it is able to calculate an exact workload irrespective of a time required for processing a task. In particular, it is able to exactly calculate a minimum speed (i.e., 10/20=0.5) of a processor. Therefore, since this method is flexibly applicable to a task having one of various processing speeds, it is advantageous in that a processor speed required to the minimum can be calculated by calculating an exact workload.

In the following description, the present invention is explained in detail with reference to FIG. 9.

Figure 9:
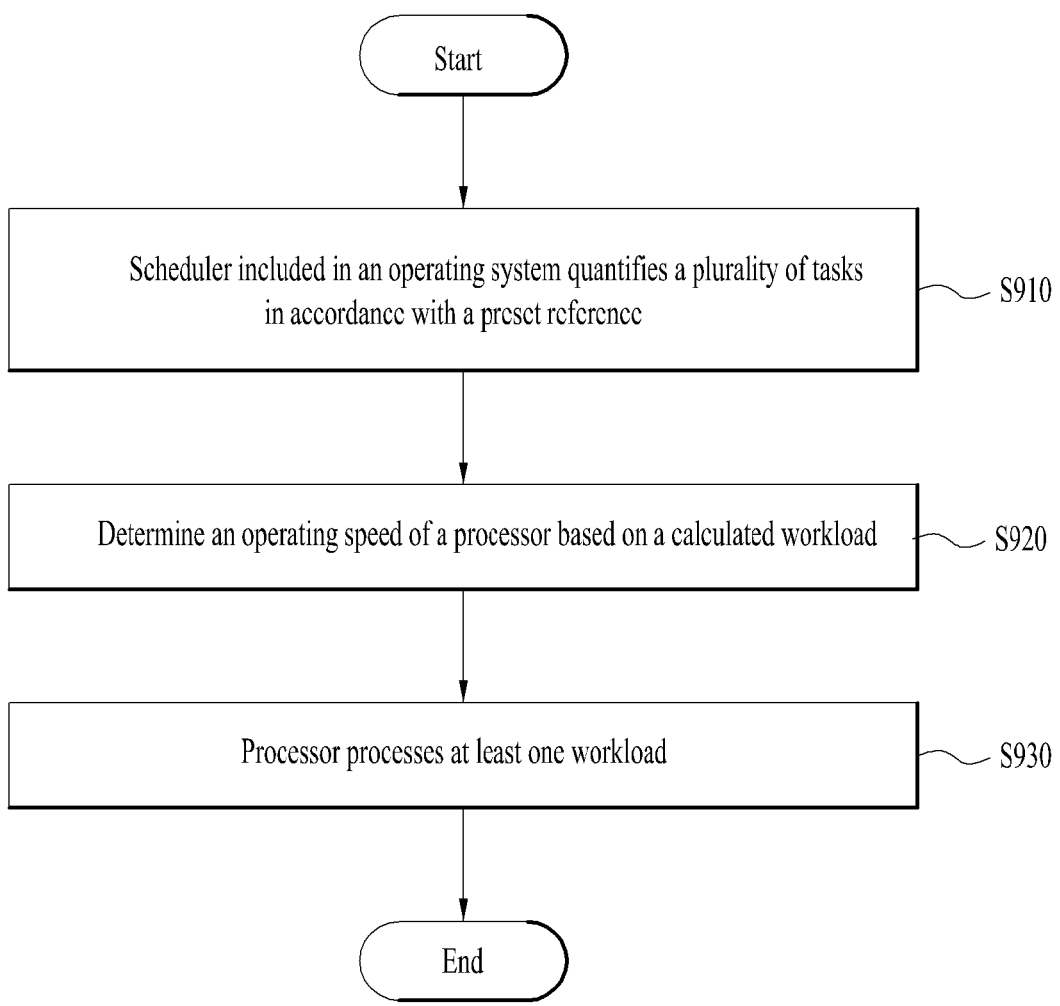
FIG. 9 is a flowchart for one example of processing a plurality of tasks in a manner of quantifying a plurality of the tasks into at least one workload in accordance with a preset reference according to the present invention.

FIG. 9 is a flowchart for one example of processing a plurality of tasks in a manner of quantifying a plurality of the tasks into at least one workload in accordance with a preset reference according to the present invention.

For clarity and convenience of the following description, one task arriving ahead of the other shall be named a first task. And, a task arriving behind the former shall be named a second task.

Referring to FIG. 9, a scheduler included in an operating system is able to calculate a plurality of tasks in a manner of quantifying them into at least one or more workloads in accordance with a preset reference [S910].

As mentioned in the foregoing description, the preset reference becomes an arrival timing point of a second task from an arrival timing point of a first task followed by the second task.

If a plurality of the workloads are calculated, an operating speed of a processor is determined based on the calculated workloads [S920]. Once the operating speed of the processor is determined, the processor processes a plurality of the tasks entirely by processing a plurality of the workloads [S930].

Therefore, by calculating an operating speed of the processor, which is required to the minimum with reference to the exactly calculated workloads, a battery duration can be increased and an environment suitable for multitasking can be established.

Meanwhile, after workloads have been calculated by the present invention, if a difference between the arrival timing point of the first task and the switching timing point of the arrival of the second task is elongated, the processor processes each of the workloads by maintaining a previous speed.

In doing so, if a task having an unexpected load size arrives, it may cause a problem that the arriving task can not be processed at the previous processor speed.

Therefore, one embodiment of the present invention, if a difference between an arrival timing point of a first task and a switching timing point of an arrival of a second task exceeds a preset threshold time, a method of increasing an operating speed of a process into a preset range can be provided.

This is described with reference to FIG. 10 as follows.

Figure 10:
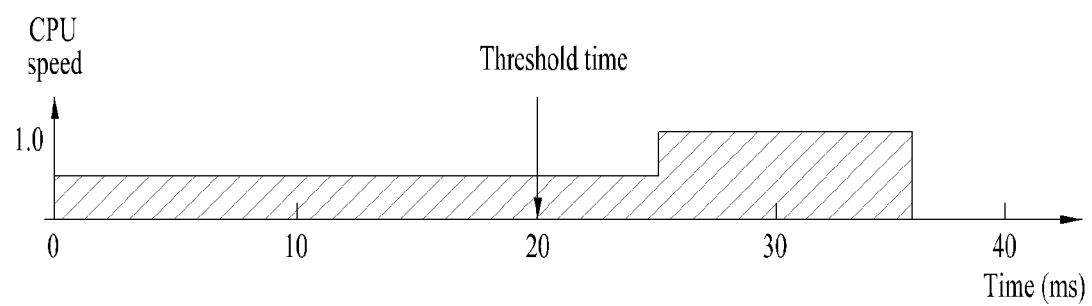
FIG. 10 is a diagram for one example of increasing an operating speed of a processor, if a difference between arrival times of tasks exceeds a threshold time, according to the present invention.

FIG. 10 is a diagram for one example of increasing an operating speed of a processor, if a difference between arrival times of tasks exceeds a threshold time, according to the present invention.

Referring to FIG. 10, since a single first task arrives instead of a plurality of tasks, it is unable to calculate a switching timing point of an arrival of a second task next to a first task from a timing point of an arrival of the first task, a previous speed (i.e., 1.0) of a processor is continuously applied.

In doing so, if a point of 25 ms is checked, despite that a load for requesting a processor speed of 2.0 can be included, a previous speed of 1.0 is maintained because a second task has not arrived. Hence, it may cause degradation of performance.

According to the present invention, therefore, if a difference between times of arrivals of tasks exceeds a threshold distance, an operating speed of a processor can be increased in a predetermined range.

In particular, referring to FIG. 10, if a threshold time is set to 20 ms, since a time difference of an arrival of a second task from an arrival of a first task exceeds a threshold time of 20 ms, a speed of a processor can correspond to 2.0 by increasing by a preset range of 1.0.

The threshold time and the range of the increased operating speed is previously set in manufacturing a terminal or can be randomly changed by a user.

Therefore, an exact workload can be calculated using inter-task arrival time. And, it is also able to prepare for a processing of an unexpected large load.

Meanwhile, as a method of enhancing performance of a processor, it is able to use a method of lowering a clock frequency and a supply voltage for an operation of the processor within a range free from performance degradation. For a representative example of such a method, there is DVFS (dynamic voltage and frequency scaling) scheme.

If the DVFS scheme is applied, it is able to lower a frequency and voltage for driving a processor. Hence, it brings an effect of extending a batter use time. Yet, there is a constraint of lowering a frequency and voltage within a range, in which performance is not degraded, when a task is processed.

In doing so, it is able to utilize a method as follows. First of all, an urgent task for determining performance of a mobile terminal is designated in advance. Secondly, the designated task in quantified into a single workload only. Thirdly, the quantified workload is processed by a processor.

Therefore, according to another embodiment of the present invention, a following method can be provided. First of all, a plurality of tasks can be classified into a plurality of groups in accordance with a resource used to perform each of the tasks. Secondly, a scheduler quantifies a task, which is included in a previously designated group among a plurality of the classified groups, into at least one workload.

In particular, if a method of classifying a plurality of tasks into a plurality of groups, designating an important one of a plurality of the classified groups only, and quantifying the designated group into workload(s) is used, it is able to process an important task preferentially by a group unit. Therefore, the effect of the present invention can be more efficiently secured.

Representatively, a reference for distinguishing a plurality of groups can use at least one of a type of a resource used by each task and a use ratio of the resource.

For instance, as mentioned in the foregoing description, a plurality of the groups can be classified into an HRT group having a top priority processing order, a DBSRT group having a processing order next to that of the HRT group, an RBSRT group having a processing order next to that of the DBSRT group, and an NRT group having a processing order next to that of the RBSRT.

Yet, the above-mentioned HRT, DBSRT, RBSRT and NRT are just exemplary. And, a plurality of groups can be classified into groups of types differing from each other in accordance with a type and use ratio of a resource used by each task.

Therefore, the present invention is able to provide a function of classifying a plurality of tasks into a plurality of groups and then quantifying a task included in at least one previously designated group among a plurality of the classified groups into a workload.

In this case, the designated group is set in the course of manufacturing a terminal in advance or can be randomly changed by a user.

Meanwhile, a scheduler is able to perform a scheduling in a manner of giving a primary processing order to enable a task, which is included in a group including an urgent task having performance depend thereon, to be preferentially processed and giving a secondary processing order to a group including a non-urgent task having no relation to performance. If the scheduling is applied, it is able to guarantee an effect that a frequency and voltage of a processor can be further lowered in a range capable of avoiding degradation of performance.

In this case, it is able to set a group, to which a high priority is given, to be included in a group designated to calculate a workload. For instance, the HRT or DBSRT group, to which a priority will be given due to having high significance, among HRT, DBSRT, RBSRT and NRT groups can be designated as a target group to calculate a workload all the time.

Thus, a group having a high priority given thereto should be included in a designated group because of the following reason. First of all, a task included in such a high priority given group as an HRT group and the DBSRT group is always processed more preferentially than a task included in another group. Hence, even if the RBSRT group is designated, a task included in the RBSRT group can be processed after a task included in the HRT or DBSRT group has been processed.

Figure 11:
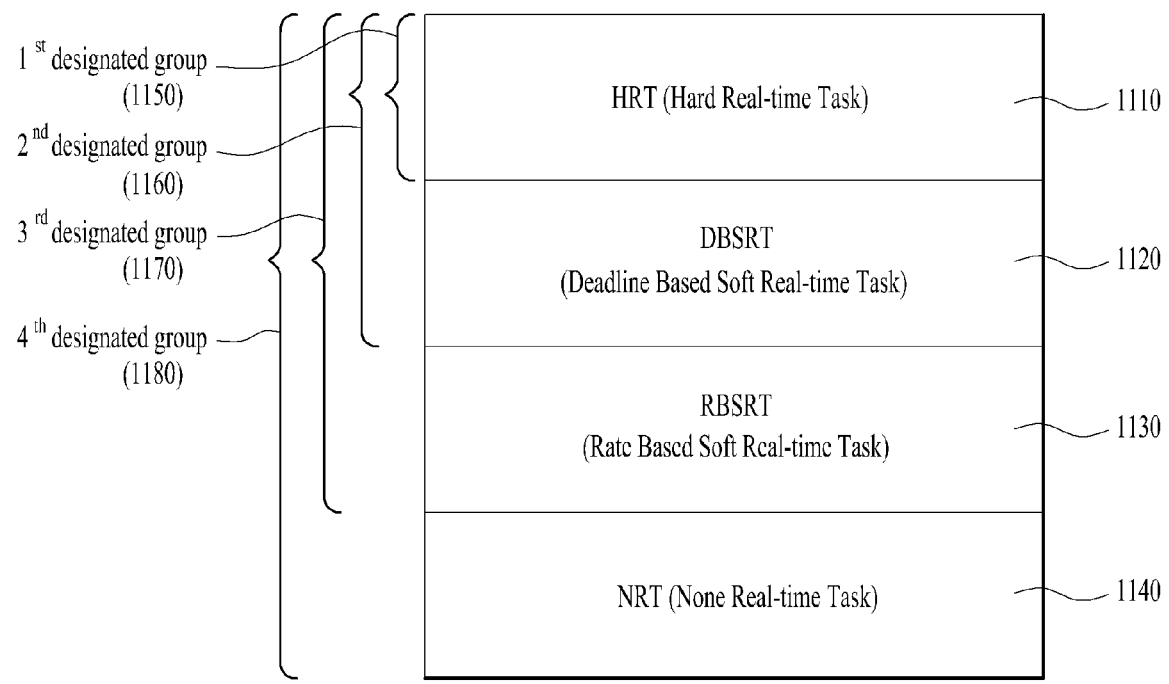
FIG. 11 is a diagram for one example of classifying a plurality of tasks into a plurality of groups in accordance with a used resource according to another embodiment of the present invention.

FIG. 11 is a diagram for one example of classifying a plurality of tasks into a plurality of groups in accordance with a used resource according to another embodiment of the present invention.

Referring to FIG. 11, among an HRT group, a DBSRT group, an RBSRT group and an NRT group, a first designated group 1150 including the HRT group only, a second designated group 1160 including the HRT group and the DBSRT group, a third designate group 1170 including the HRT group, the DBSRT group and the RBSRT group, a fourth designated group 1180 including the HRT group, the DBSRT group, the RBSRT group and the NRT group or the like can be utilized.

Accordingly, since the contents of the present invention are applicable in consideration of a processing order in a scheduling as well as a workload calculating method by a group unit, it is able to guarantee such an effect as lowering a frequency and voltage of a processor more efficiently.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a memory storing an operating system having a scheduler, wherein the scheduler is configured to:
   perform a first scheduling function on a plurality of tasks to determine a first processing order of the plurality of tasks according to a first reference;
   perform a second scheduling function on the plurality of tasks to determine a second processing order of the plurality of tasks according to a second reference after determining that at least a first task among the plurality of tasks meets the second reference; and
   switch from the first processing order to the second processing order such that the at least a first task which has met the second reference is processed preferentially among the plurality of tasks; and
   a processor configured to perform an operation related to the operating system and process the plurality of the tasks according to at least the first or second processing order,
   wherein each of the plurality of tasks is processed according to the second processing order after the second scheduling function is performed, the at least a first task being processed preferentially among the plurality of tasks ordered according to the second processing order,
   wherein:

the plurality of the tasks are classified into a plurality of groups including a first group having a top priority processing order, a second group having a second processing order, a third group having a third processing order and a fourth group having a fourth processing order, the first group includes a plurality of tasks using a resource capable of completing a task performance when used at a specific timing only, the second group includes a plurality of tasks using a resource capable of completing a task performance when used at a random timing, the third group includes a plurality of tasks using a resource capable of completing a task performance when used at a preset ratio for a random interval irrespective of timing, and the fourth group includes a plurality of tasks except for the tasks included in the first group, the second group, or the third group.

2. The mobile terminal of claim 1, wherein a frequency and voltage for operating the processor are determined based on a processing order of each of the plurality of tasks ordered according to the first processing order or second processing order.

3. The mobile terminal of claim 1, wherein the scheduler is included in a kernel of the operating system.

4. The mobile terminal of claim 1, wherein the first reference is a timing point at which the plurality of the tasks are generated.

5. The mobile terminal of claim 1, wherein the at least a first task meets the second reference when the at least a first task uses the resource capable of completing the task performance among a plurality of resources having task timing constraints that are different from each other when the resource is used at the specific timing only.

6. The mobile terminal of claim 1, wherein:
the plurality of the tasks are classified into the plurality of groups according to at least one type of resource used to perform each of the plurality of tasks and a use ratio of the at least one type of resource such that the plurality of groups have consecutive processing orders; and
the scheduler is further configured to perform the second scheduling function by determining whether each of the plurality of tasks ordered according to the first processing order belongs to a specific one of the classified plurality of groups and allowing a processing order of each of the plurality of tasks to be changed according to a processing order given to the specific one of the classified plurality of groups.

7. The mobile terminal of claim 1, wherein:
the scheduler is further configured to perform the second scheduling function by assigning each of a plurality of processing numbers to each of the plurality of tasks according to each of the first and second processing orders; and
the plurality of processing numbers are distinguished according to each of the classified plurality of groups.

8. A method of controlling a mobile terminal, the method comprising:
performing, by a scheduler included in an operating system stored in a memory of the mobile terminal, a first scheduling function on a plurality of tasks to determine a first processing order of the plurality of tasks according to a first reference;
determining that at least a first task among the plurality of tasks meets a second reference;
performing a second scheduling function on the plurality of tasks to determine a second processing order of the plurality of tasks according to the second reference after determining that the at least a first task among the plurality of tasks has met a second reference;
switching from the first processing order to a second processing order such that the at least a first task which has met the second reference is processed preferentially among the plurality of tasks; and
processing each of the plurality of tasks according to the second processing order after the second scheduling function is performed, the at least a first task being processed preferentially among the plurality of tasks ordered according to the second processing order, wherein:
the plurality of the tasks are classified into a plurality of groups including a first group having a top priority processing order, a second group having a second processing order, a third group having a third processing order and a fourth group having a fourth processing order, the first group includes a plurality of tasks using a resource capable of completing a task performance when used at a specific timing only, the second group includes a plurality of tasks using a resource capable of completing a task performance when used at a random timing, the third group includes a plurality of tasks using a resource capable of completing a task performance when used at a preset ratio for a random interval irrespective of a timing, and the fourth group includes a plurality of tasks except for the tasks included in the first group, the second group, or the third group.

9. The method of claim 8, further comprising:
determining a frequency and voltage for operating a processor of the mobile terminal that processes the plurality of the tasks, the frequency and voltage based on a processing order of each of the plurality of the tasks ordered according to the first processing order or second processing order.

10. The method of claim 8, wherein the scheduler is included in a kernel of the operating system.

11. The method of claim 8, wherein the first reference is a timing point of at which the plurality of the tasks are generated.

12. The method of claim 8, wherein the at least a first task meets the second reference when the at least a first task uses the resource capable of completing the task performance among a plurality of resources having task timing constraints that are different from each other when the resource is used at the specific timing only.

13. The method of claim 8, wherein:
the plurality of the tasks are classified into the plurality of groups according to at least one type of resource used to perform each of the plurality of tasks and a use ratio of the at least one type of resource such that the plurality of groups have consecutive processing orders; and
performing the second scheduling function comprises determining whether each of the plurality of tasks ordered according to the first processing order belongs to a specific one of the classified plurality of groups and allowing a processing order of each of the plurality of tasks to be changed according to a processing order given to the specific one of the classified plurality of groups.

14. A mobile terminal comprising:
a memory including an operating system having a scheduler, wherein the scheduler is configured to quantify a plurality of tasks into at least one workload according to a preset reference in order to process the plurality of the tasks; and a processor configured to process an operation related to the operating system and the at least one workload, wherein the preset reference is a switching timing point at which a timing point of a second task among the plurality of tasks arrives after a timing point at which a first task among the plurality of tasks arrives, the second task following the first task among the plurality of the tasks, wherein:

the plurality of the tasks are classified into a plurality of groups including a first group having a top priority processing order, a second group having a second processing order, a third group having a third processing order and a fourth group having a fourth processing order, the first group includes a plurality of tasks using a resource capable of completing a task performance when used at a specific timing only, the second group includes a plurality of tasks using a resource capable of completing a task performance when used at a random timing, the third group includes a plurality of tasks using a resource capable of completing a task performance when used at a preset ratio for a random interval irrespective of a timing, and the fourth group includes a plurality of tasks except for the tasks included in the first group, the second group, or the third group.

15. A method of controlling a mobile terminal, the method comprising:

quantifying, by a scheduler included in an operating system stored in a memory of the mobile terminal, a plurality of the tasks into at least one workload according to a preset reference in order to process the plurality of tasks; and processing, by a processor of the mobile terminal, the at least one workload, wherein the preset reference is a switching timing point at which a timing point of a second task among the plurality of tasks arrives after a timing point at which a first task among the plurality of tasks arrives, the second task following the first task among the plurality of the tasks, wherein:

the plurality of the tasks are classified into a plurality of groups including a first group having a top priority processing order, a second group having a second processing order, a third group having a third processing order and a fourth group having a fourth processing order, the first group includes a plurality of tasks using a resource capable of completing a task performance when used at a specific timing only, the second group includes a plurality of tasks using a resource capable of completing a task performance when used at a random timing, the third group includes a plurality of tasks using a resource capable of completing a task performance when used at a preset ratio for a random interval irrespective of a timing, and the fourth group includes a plurality of tasks except for the tasks included in the first group, the second group, or the third group.

* * * * *